(12) United States Patent
Maki (10) Patent No.: US 9,762,341 B2
(45) Date of Patent: Sep. 12, 2017

(54) TIME SYNCHRONIZATION SYSTEM (71) Applicant: Seiko Epson Corporation, Tokyo (JP)

(72) Inventor: Yoshiyuki Maki, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/945,656

(22) Filed: Nov. 19, 2015

(65) Prior Publication Data
US 2016/0149610 A1    May 26, 2016

(30) Foreign Application Priority Data

Nov. 20, 2014   (JP) .................. 2014-235321

(51) Int. Cl.
*H04J 14/08* (2006.01)
*H04J 3/06* (2006.01)

(52) U.S. Cl.
CPC .......... *H04J 3/0644* (2013.01); *H04J 3/0641* (2013.01)

(58) Field of Classification Search
CPC .... H04B 1/7073; H04L 7/0075; H04L 7/0087
See application file for complete search history.

(56) References Cited

U.S. PATENT DOCUMENTS

| | | | |
|---|---|---|---|
| 6,417,800 B1 | 7/2002 | Valio et al. | |
| 2010/0067507 A1* | 3/2010 | Park | H04J 3/0638 370/338 |
| 2014/0010554 A1* | 1/2014 | Midavaine | G01S 5/16 398/154 |
| 2014/0062781 A1* | 3/2014 | Mathews | G01S 19/246 342/357.64 |
| 2016/0154109 A1* | 6/2016 | Achanta | G01S 19/215 342/357.58 |

FOREIGN PATENT DOCUMENTS

| | | |
|---|---|---|
| JP | 09-064813 A | 3/1997 |
| JP | 2001-215269 A | 8/2001 |
| JP | 2009-111654 A | 5/2009 |
| JP | 2012-023705 A | 2/2012 |
| JP | 2013-207526 A | 10/2013 |

\* cited by examiner

Primary Examiner — Dzung Tran
(74) Attorney, Agent, or Firm — Harness, Dickey & Pierce, P.L.C.

(57) ABSTRACT

A time synchronization system includes a clock supply apparatus that includes an oscillator and generates a first time signal; and a time synchronization apparatus that includes a receiver which includes a fluctuation reducing unit provided on an outside of the clock supply apparatus, and which generates a second time signal based on a satellite signal. In addition, it is preferable that the time synchronization system is used in the network synchronization based on a master-slave synchronization method. Further, it is preferable that the oscillator is an atomic oscillator. In addition, it is preferable that the receiver and the clock supply apparatus are disposed at positions which are separated from each other. Further, it is preferable that the receiver and the clock supply apparatus are connected to each other via an optical fiber.

11 Claims, 5 Drawing Sheets

TIME SYNCHRONIZATION SYSTEM

CROSS REFERENCE

This application claims the benefit of Japanese Application No. 2014-235321, filed on Nov. 20, 2014. The disclosure of the prior application is hereby incorporated by reference herein in its entirety.

BACKGROUND

1. Technical Field

The present invention relates to a time synchronization system.

2. Related Art

A network synchronization which synchronizes a time signal (a clock signal) in each of a plurality of stations has been known.

For example, in the related art, as a "Synchronous-Ethernet (a trade mark)", an optical synchronous network has a hierarchical organization structure in which an "atomic oscillator using a cesium atom", an "atomic oscillator using a rubidium atom", a "crystal oscillator", and the like are disposed in order from a host station to a subordinate station, and is based on frequency synchronization. However, in near future, for the reason of system integration with a mobile base station, it is required to perform highly precise time (phase) synchronization between the stations.

JP-A-2013-207526 discloses a system which includes a GPS receiver installed in each of nodes (stations), detects abnormality of an oscillator, and switches clock paths. By utilizing this system, there is an advantage that it is possible to maintain the frequency of the time signal for each node and phase (time) with high accuracy.

However, the time synchronization system using satellite signals, which is disclosed in JP-A-2013-207526 is required to have a structure which compensates for hold-over when the satellite signal cannot be received, but since a GPS receiver is placed at the same position as that of the structure which compensates for hold-over in the system disclosed in JP-A-2013-207526, the environment in which the satellite signal is received is restricted. In addition, when the GPS receiver and the structure which compensates for hold-over are distant from each other via a wiring or the like, in accordance with a state of a radio wave including the satellite signal or the like, 1PPS, that is, a phase of the time signal fluctuates, and thereby a short-term time (phase) accuracy is deteriorated. Examples of factors that greatly affect the state of the radio wave which is received by the GPS receiver include the influence of the ionosphere, the influence of other radio waves, disposition of a GPS satellite, and an obstacle between the GPS satellite and a GPS antenna.

SUMMARY

An advantage of some aspects of the invention is to provide a time synchronization system that performs short-term time synchronization with high accuracy (time synchronization accuracy) of a time signal.

The invention can be implemented as the following forms or application examples.

APPLICATION EXAMPLE 1

A time synchronization system according to this application example of the invention includes a clock supply apparatus that includes an oscillator and generates a first time signal; and a time synchronization apparatus that includes a receiver which includes a fluctuation reducing unit provided on an outside of the clock supply apparatus, and which generates a second time signal based on a satellite signal.

By providing the fluctuation reducing unit in the time synchronization apparatus, it is possible to reduce the phase fluctuation of the second time signal (a time signal), and to improve short-term time (the phase) accuracy of the second time signal. Therefore, in the network synchronization, it is possible to improve short-term time (the phase) synchronization accuracy.

APPLICATION EXAMPLE 2

It is preferable that the time synchronization system according to the application example of the invention is used in network synchronization based on a master-slave synchronization method.

With this configuration, in the network synchronization, it is possible to improve the short-term time synchronization accuracy.

APPLICATION EXAMPLE 3

In the time synchronization system according to the application example of the invention, it is preferable that the oscillator is an atomic oscillator.

With this configuration, it is possible to obtain the first time signal with high accuracy.

APPLICATION EXAMPLE 4

In the time synchronization system according to the application example of the invention, it is preferable that the receiver and the clock supply apparatus are disposed at positions which are separated from each other.

With this configuration, it is possible to dispose the receiver at a position where the satellite signal can be easily received.

APPLICATION EXAMPLE 5

In the time synchronization system according to the application example of the invention, it is preferable that the receiver and the clock supply apparatus are connected to each other via an optical fiber.

With this configuration, it is possible to reduce loss that can occur when the receiver and the clock supply apparatus communicate with each other, and to improve communication speed.

APPLICATION EXAMPLE 6

In the time synchronization system according to the application example of the invention, it is preferable that the fluctuation reducing unit includes a phase synchronization circuit.

With this configuration, it is possible to reduce the phase fluctuation of the second time signal by the phase synchronization circuit, and to obtain the second time signal with high accuracy.

APPLICATION EXAMPLE 7

In the time synchronization system according to the application example of the invention, it is preferable that the phase synchronization circuit includes a filter, and the time constant of the filter is set within a range of 1 second to 10 seconds.

With this configuration, it is possible to reduce the phase fluctuation of the second time signal by the filter, and to obtain the second time signal with high accuracy.

APPLICATION EXAMPLE 8

In the time synchronization system according to the application example of the invention, it is preferable that the first time signal is generated so as to be used when it is not possible to generate the second time signal.

With this configuration, even in a case of the occurrence of hold-over, it is possible to use the first time signal instead of the second time signal, and in the network synchronization, it is possible to maintain short-term time synchronization with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the time synchronization system according to the invention will be specifically described with reference to an embodiment illustrated in the accompanying drawings.

An application of the time synchronization system according to the invention is not particularly limited, but in the following embodiment, a case where a time synchronization system using a global positioning system (GPS) is used in network synchronization will be described as an example. The GPS is one of global navigation satellite systems (GNSS) using an artificial satellite. In addition, a method of the network synchronization is not particularly limited. For instance, examples of the method of the network synchronization include an independent synchronization method, a master-slave synchronization method, a mutual synchronization method, and the like. However, it is preferable to employ the master-slave synchronization method which is employed in Japan, and a case of using the master-slave synchronization method will be described as an example in the following embodiment. Note that, in the independent synchronization method, each station independently has a high-accuracy oscillator. In addition, the master-slave synchronization method is a method of synchronizing a clock signal of the high-accuracy oscillator in a master station with a clock signal of an oscillator in a slave station, which can efficiently obtain a high-accuracy clock signal. In addition, the mutual synchronization method is a method of mutually controlling a variable oscillator of each station.

Figure 1:
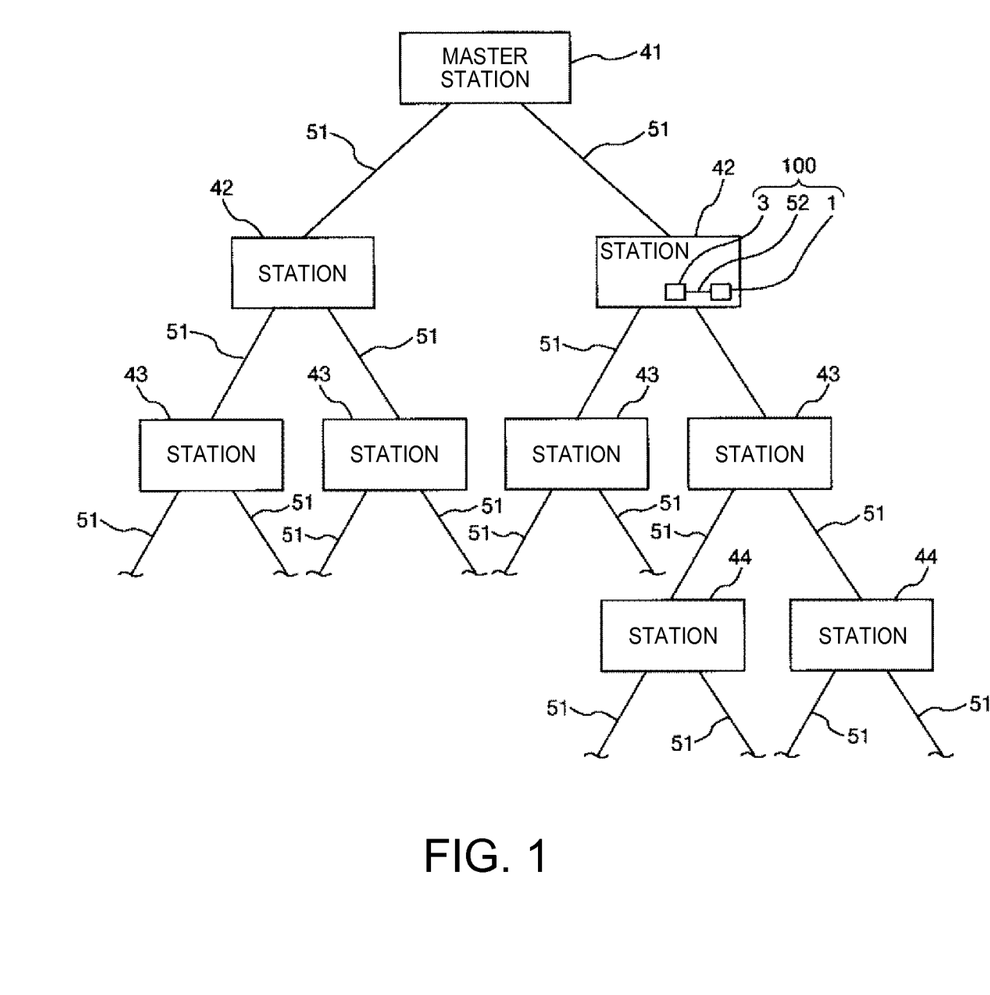
FIG. 1 is a block diagram illustrating an embodiment in a case where a time synchronization system according to the invention is used in network synchronization.
Figure 2:
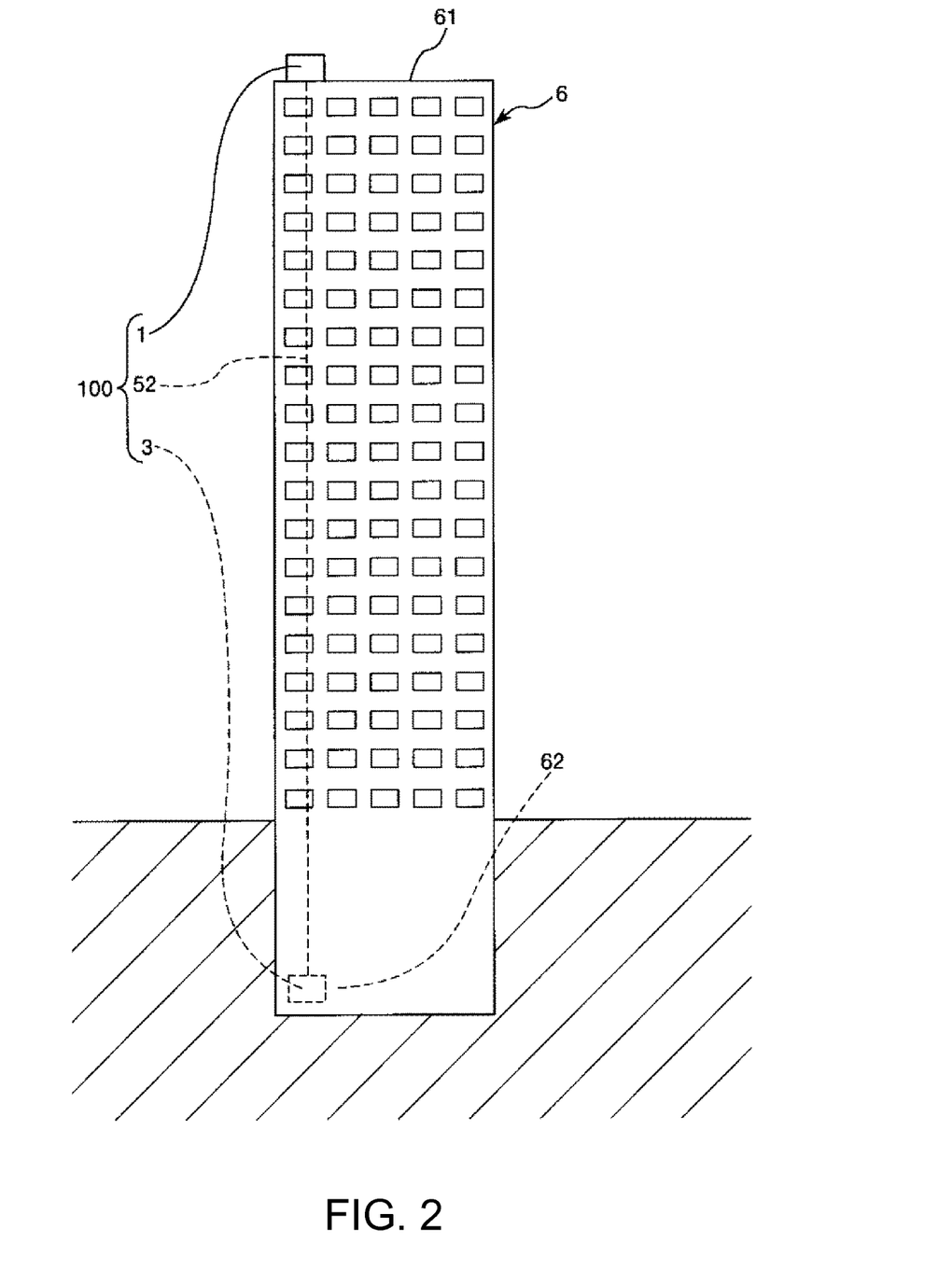
FIG. 2 is a diagram schematically illustrating an example of installation positions of a time synchronization apparatus and a clock supply apparatus of the time synchronization system in FIG. 1.
Figure 3:
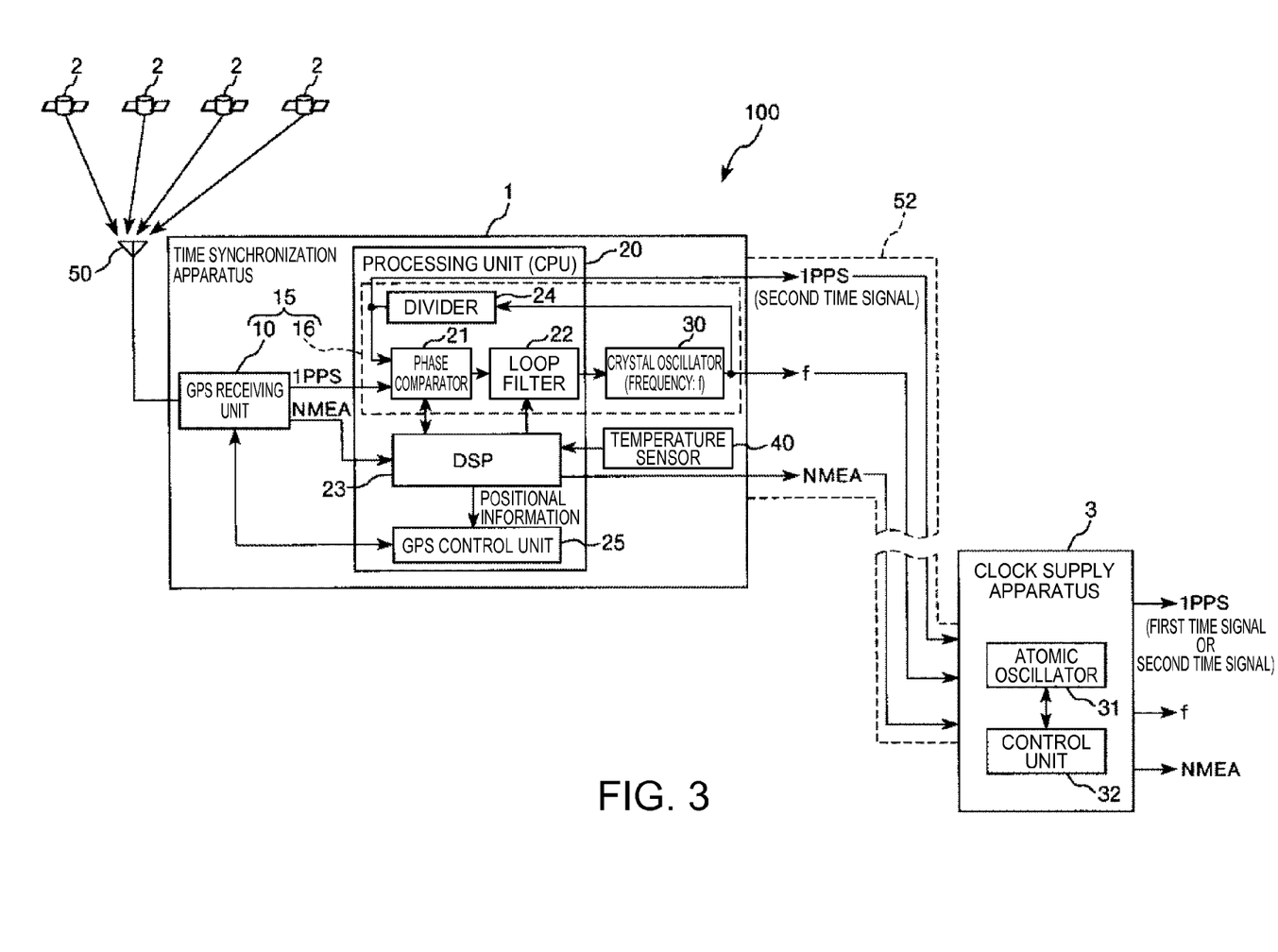
FIG. 3 is a diagram illustrating a schematic configuration of the time synchronization system in FIG. 1.
Figure 4:
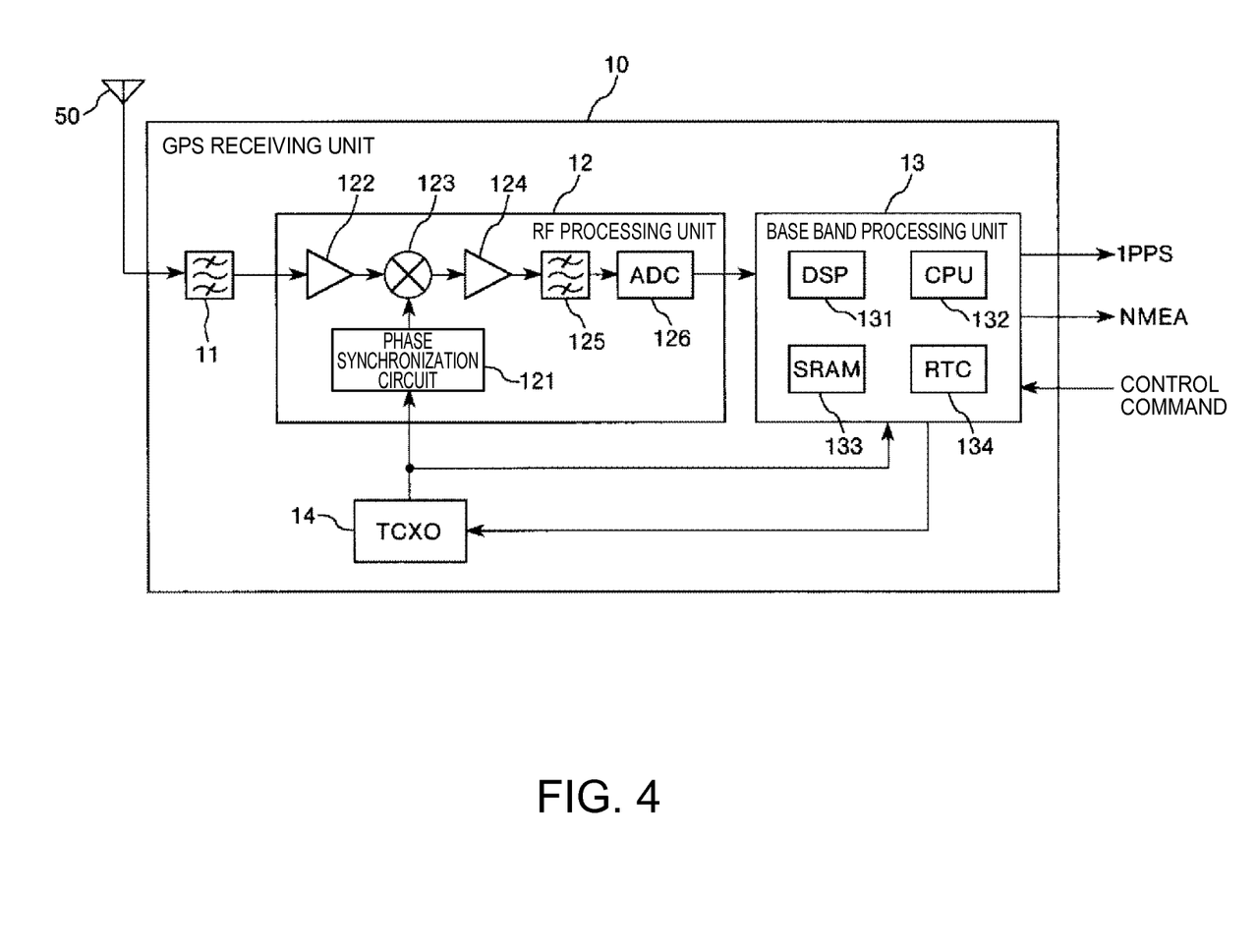
FIG. 4 is a block diagram illustrating a configuration example of a GPS receiving unit of the time synchronization system in FIG. 1 to FIG. 3.
Figure 5:
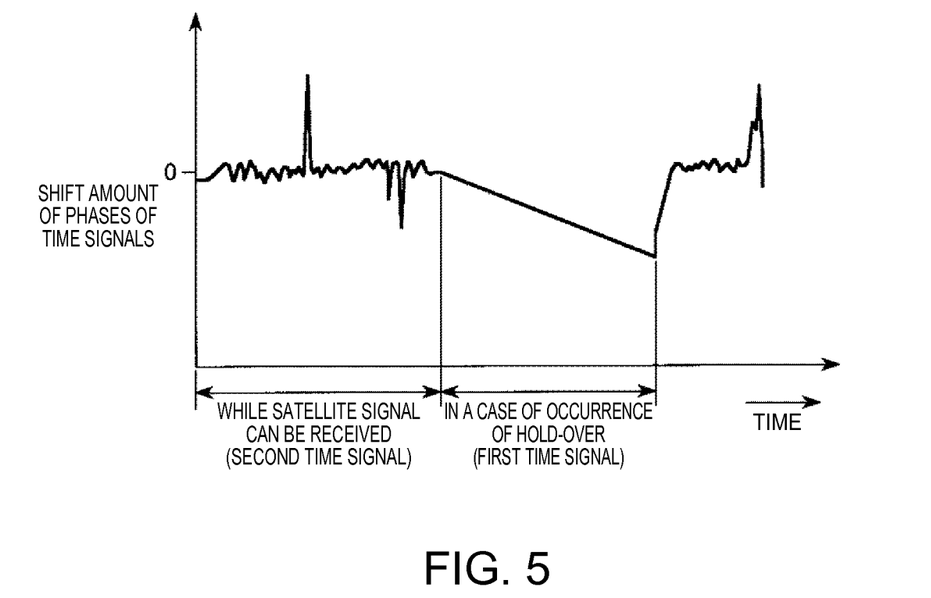
FIG. 5 is a diagram illustrating a graph in a case where a deviation amount of the phase of a first time signal and a second time signal which are generated by using a comparative system obtained by removing a phase synchronization circuit from the time synchronization system in FIG. 1 is represented by a vertical axis and time is represented by a horizontal axis.
Figure 6:
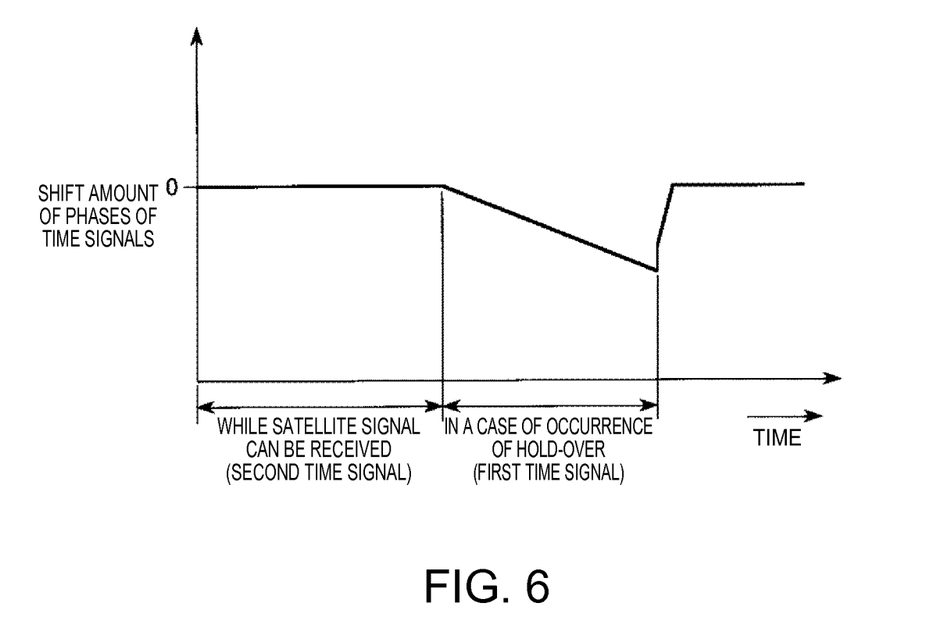
FIG. 6 is a diagram illustrating a graph in a case where a deviation amount of phase of a first time signal and a second time signal which are generated by using the time synchronization system in FIG. 1 is represented by a vertical axis and a time is represented by a horizontal axis.

FIG. 1 is a block diagram illustrating an embodiment in a case where a time synchronization system according to the invention is used in network synchronization. FIG. 2 is a diagram schematically illustrating an example of installation positions of a time synchronization apparatus and a clock supply apparatus of the time synchronization system in FIG. 1. FIG. 3 is a diagram illustrating a schematic configuration of the time synchronization system in FIG. 1. FIG. 4 is a block diagram illustrating a configuration example of a GPS receiving unit of the time synchronization system in FIG. 1 to FIG. 3. FIG. 5 is a diagram illustrating a graph in a case where a deviation amount of phase of a first time signal and a second time signal which are generated by using a comparative system obtained by removing a phase synchronization circuit from the time synchronization system in FIG. 1 is represented by a vertical axis and a time is represented by a horizontal axis. FIG. 6 is a diagram illustrating a graph in a case where a deviation amount of the phase of a first time signal and a second time signal which are generated by using the time synchronization system in FIG. 1 is represented by a vertical axis and a time is represented by a horizontal axis. Note that, in FIG. 2, the sizes of the time synchronization apparatus and the clock supply apparatus are enlarged (larger than actual sizes).

As illustrated in FIG. 1, a master station (a station) 41 is connected to one or a plurality of (two stations in FIG. 1) stations 42 via a transmission path 51, each of the stations 42 is connected to one or a plurality of (two stations in FIG. 1) subordinate stations 43 via the transmission path 51, and each of the stations 43 is connected to one or a plurality of (two stations in FIG. 1) subordinate stations 44 (partially not shown) via the transmission path 51. Likewise, the stations (not shown) are connected to each other via the transmission path (not shown) so as to form a synchronous network (for example, an optical synchronous network). In addition, in the synchronous network, a phase (time) of a time signal is synchronized (network synchronization) by the master-slave synchronization method. In addition, a method of the communication between the stations is not particularly limited, for example, a method of using an optical signal which uses an optical fiber as the transmission path 51 between the stations may be employed, or a method of using an electrical signal may be employed, but in the embodiment, a case of employing the former method will be described as an example. Note that, specific examples of a transmission method include a synchronous optical network (SONET) method, a synchronous digital hierarchy (SDH) method, and the like.

As illustrated in FIG. 1 to FIG. 3, a time synchronization system 100 is provided with a time synchronization apparatus 1 and a clock supply apparatus 3, and is disposed in the station 42.

The time synchronization apparatus 1 (a GPS receiver 15) and the clock supply apparatus 3 are disposed at positions which are different from each other, and are separated from each other by a specified distance. The separation distance between the time synchronization apparatus 1 (the GPS receiver 15) and the clock supply apparatus 3 is not particularly limited, and for example, several tens of m or more can be specific examples.

In addition, an installation position of the time synchronization system 100 is not particularly limited. For example, as illustrated in FIG. 2, in a case where the station 42 is installed in a building 6, the time synchronization apparatus 1 is disposed in, for example, a roof 61 in which a radio wave condition is satisfactory in the building 6, and the clock supply apparatus 3 is disposed in, for example, a basement 62 in the building 6. As this example, for the sake of connection between the master station 41 and other slave stations 43, the clock supply apparatus 3 may not be disposed in a place where the radio wave condition (GPS reception environment) is satisfactory in some cases. As such, by disposing the time synchronization apparatus 1 in the roof 61 or the like in which a radio wave condition is satisfactory so as to be separated from the clock supply apparatus 3, even in a case where the station 42 is installed in a place such as the basement of the building 6 or in a remote area, such as the countryside in a mountain in which the radio wave condition is deteriorated, the time synchronization apparatus 1 can receive the satellite signal.

The time synchronization apparatus 1 (the GPS receiver 15) and the clock supply apparatus 3 are connected to each other via an optical fiber 52, and thus the time synchronization apparatus 1 and the clock supply apparatus 3 can communicate with each other via the optical fiber 52. In the embodiment, a case where the clock supply apparatus 3 of the time synchronization system 100 is disposed in one of two stations 42 is illustrated in the drawing; however, the invention is not limited thereto. For example, the clock supply apparatus 3 may be disposed in the master station 41, may be disposed the other station 42, or may be disposed in the stations 43 and 44 which are lower in hierarchical order than the station 42. In other words, it is possible to dispose the clock supply apparatus 3 a predetermined one or a plurality of stations (possibly all stations).

Further, each of the time synchronization apparatus 1 and the clock supply apparatus 3 is provided with a converting circuit which converts an electrical signal into an optical signal, and a converting circuit which converts the optical signal into the electrical signal, but each converting circuit is not illustrated in the drawings. In addition, in cases where the time synchronization apparatus 1 and the clock supply apparatus 3 communicate with each other, and the time synchronization apparatus 1 and the clock supply apparatus 3 communicate with the master station 41 and the station 43, a process of converting the electrical signal into the optical signal, and a process of converting the optical signal into the electrical signal are performed in the respective cases, but in the following description, the aforementioned processes will not be described.

As illustrated in FIG. 3, the clock supply apparatus 3 is provided with an atomic oscillator (an oscillator) 31, and a control unit 32. Note that, in the clock supply apparatus 3, some or all of the components may be physically separated or integrated.

Such a clock supply apparatus 3 serves to generate a first time signal (a time signal or a clock signal), by the atomic oscillator 31, which is a substitute signal of 1PPS (hereinafter, referred to as "a second time signal" (the time signal or the clock signal) which is generated by the time synchronization apparatus 1 based on a satellite signal described below, and output the generated first time signal to the outside. The first time signal is a signal which includes pulse per second and has a frequency of 1 Hz 1. Note that, in the following description, the first time signal is also referred to as "1PPS".

The atomic oscillator 31 is an oscillator which is capable of outputting a clock signal having a high-accuracy frequency by using the transition energy of an atom, and an atomic oscillator which uses, for example, a rubidium atom and a cesium atom is well known. Examples of the atomic oscillator 31 include an atomic oscillator which uses the electromagnetically induced transparency (EIT) phenomenon (also referred to as coherent population trapping (CPT) phenomenon), and an atomic oscillator which uses the optical micro double resonance phenomenon.

Note that, the example of the oscillator of the clock supply apparatus 3 is not limited to the atomic oscillator 31, for example, a crystal oscillator such as a thermostatic chamber type crystal oscillator (OCXO) may be used.

The control unit 32 has a function of determining any one of the first time signal which is generated by the clock supply apparatus 3 and the second time signal which is generated by the time synchronization apparatus 1 based on the satellite signal described below, as the 1PPS (time signal) which is output from the time synchronization system 100. Hereinafter, the aforementioned function and an operation at the time of transmitting the 1PPS to the station 43 from the time synchronization system 100 will be described.

In the time synchronization system 100, as described below, in the time synchronization apparatus 1, the satellite signal (a radio wave) emitted from a GPS satellite 2 is received in a GPS receiving unit 10, and the GPS receiver 15 generates the second time signal as the 1PPS based on the satellite signal. As described above, since the time synchronization apparatus 1 is provided with a phase synchronization circuit 16, the phase fluctuation of the second time signal is reduced by the phase synchronization circuit 16, and thus a high-accuracy second time signal is generated. Such a second time signal is transmitted to the clock supply apparatus 3 from the time synchronization apparatus 1. Then, the control unit 32 of the clock supply apparatus 3 synchronizes a phase of the second time signal with a phase of the 1PPS which is transmitted from the master station 41, and then the synchronized second time signal is transmitted to the station 43. When the GPS receiving unit 10 can receive the satellite signal, the second time signal is used by obtaining the high-accuracy second time signal in the above-described manner. That is, the second time signal is used in preference to the first time signal.

In addition, when a case happens (hold-over) where the GPS receiving unit 10 cannot receive the satellite signal, the second time signal cannot be generated, and thus the time synchronization apparatus 1 stops generating the second time signal, and then a signal illustrating that hold-over is occurring is transmitted to the clock supply apparatus 3 from the time synchronization apparatus 1. The control unit 32 of the clock supply apparatus 3 detects the occurrence of hold-over through the signal, and then generates the first time signal as 1PPS by using the atomic oscillator 31. In addition, the clock supply apparatus 3 synchronizes a phase of the first time signal with the phase of 1PPS which is transmitted from the master station 41, and then the synchronized first time signal is transmitted to the station 43. In this way, a high-accuracy first time signal is obtained so as to be used instead of the second time signal. As such, even in a case of the occurrence of hold-over, in the network synchronization, it is possible to maintain the short-term time synchronization with high accuracy, and thereby to realize the time synchronization with high accuracy of n second-level.

As illustrated in FIG. 3, the time synchronization apparatus 1 is provided with the GPS receiving unit (the satellite signal receiving unit) 10, a processing unit (CPU) 20, a crystal oscillator (the oscillator) 30 as a voltage controlled oscillator (VCO), a temperature sensor 40, and a GPS antenna 50. An example of the crystal oscillator 30 is not particularly limited, and for example, the thermostatic chamber type crystal oscillator (OCXO) may be used. In addition, the phase synchronization circuit (phase locked loop: PLL) 16 is formed of a phase comparator 21 described below of the processing unit 20, a loop filter 22, and a divider 24, and the crystal oscillator 30. Such the phase synchronization circuit 16 is an example of the fluctuation reducing unit, and the fluctuation reducing unit may be formed of other circuits as long as it is possible to reduce or remove the phase (time) fluctuation of the second time signal. In addition, as described above, the phase synchronization circuit 16 is disposed at a position which is separated from the clock supply apparatus 3, that is, disposed on the outside of the clock supply apparatus 3 (the phase synchronization circuit 16 and the atomic oscillator 31 are not disposed on the same substrate). Further, the GPS receiver (the receiver) 15 is formed of the GPS receiving unit 10 and the phase synchronization circuit 16.

Note that, in the time synchronization apparatus 1, some or all of the components may be physically separated or integrated. For example, each of the GPS receiving unit 10 and the processing unit 20 may be implemented by a separate IC chips, or the GPS receiving unit 10 and the processing unit 20 may be implemented by one IC chip.

The time synchronization apparatus 1 serves to receive the satellite signal from the GPS satellite (a positional information satellite) 2, and generate the high-accuracy 1PPS (1 pulse per second or the second time signal). The 1PPS is a pulse signal (a timing signal or a time signal) which synchronizes with a coordinated universal time (UTC), and includes 1 pulse per second.

The GPS satellite 2 orbits around a predetermined trajectory above the Earth, and transmits the satellite signal which is obtained by interposing (modulates) a navigation message and a course/acquisition code (C/A code) on a radio wave of 1.57542 GHz (an L1 wave) which is a carrier wave to stations on the ground.

The C/A code for identifying the satellite signals of about 30 GPS satellites 2 that currently exist, and is a specific pattern formed of 1023 chips (1 ms cycle) of which each chip is +1 or −1. The satellite signal and each pattern of the C/A code are correlated to each other, and thus it is possible to detect the C/A code which is interposed on the satellite signal.

The satellite signal (specifically, the navigation message) which is transmitted from each of the GPS satellites 2 includes orbital information indicating a position on the trajectory of each of the GPS satellites 2. In addition, each of the GPS satellites 2 is installed in an atomic clock, and the satellite signal includes highly accurate time information counted by the atomic clock. Therefore, it is possible to obtain accurate information on the position and time of a reception point (an installation position of GPS antenna 50) by receiving the satellite signals from four or more of the GPS satellites 2, and performing positioning calculation by using the orbital information and the time information which are included in each of the satellite signals. Specifically, a four-dimensional equation having three dimensional positions (x, y, and z) and time t of the reception point as four variables may be set up to find the solution.

In addition, when the position of the reception point is already known, it is possible to obtain the time information of the reception point by receiving the satellite signals from one or more of GPS satellites 2, and using the time information which is included in each of the satellite signals. In the embodiment, the position of the time synchronization apparatus 1 is already known, and thus, as described above, it is possible to obtain the time information of the reception point.

Further, it is possible to obtain information on a difference between the time of each of the GPS satellites 2 and the time of the reception point by using orbital information which is included in each of the satellite signals. Meanwhile, a slight time error of the atomic clock which is installed in each of the GPS satellites 2 is measured by a control segment on the ground, the satellite signal includes a time correcting parameter for correcting the time error, and thereby it is possible to obtain highly accurate time information by correcting the time of the reception point through the time correcting parameter.

The satellite signal as described above is received in the GPS receiving unit 10 via the GPS antenna 50.

The GPS antenna 50 is an antenna which receives various types of radio waves including the satellite signal, and is connected to the GPS receiving unit 10.

The GPS receiving unit 10 performs various processes based on the satellite signal received via the GPS antenna 50.

In detail, the GPS receiving unit 10 includes a normal positioning mode (a first mode) and a position fixing mode (a second mode), and is set to any one of the normal positioning mode and the position fixing mode in accordance with a control command (a control command for setting mode) from the processing unit (CPU) 20.

The GPS receiving unit 10 serves as a "positioning calculation unit" in the normal positional mode, receives the satellite signals transmitted from the plurality of (preferably four or more) GPS satellites 2, and then performs the positioning calculation based on orbital information (specifically, the ephemeris data, almanac data, or the like) and time information (specifically, week number data, Z-count data, or the like) which are included in the received satellite signals.

In addition, the GPS receiving unit 10 serves as "1PPS (the timing signal or the second time signal) generating unit" in the position fixing mode, receives the satellite signals from at least one GPS satellite 2, and then generates 1PPS (the second time signal) based on the orbital information and time information which are included in the received satellite signal, and the positional information of the reception point. In this way, the satellite signal includes the orbital information and the time information which are used to generate the 1PPS, and thus the GPS receiving unit 10 can generate the high-accuracy 1PPS.

Hereinafter, a configuration of the GPS receiving unit 10 will be described in detail.

As illustrated in FIG. 4, the GPS receiving unit 10 is provided with a surface acoustic wave (SAW) filter 11, a RF processing unit 12, a base band processing unit 13, and a temperature compensated crystal oscillator (TCXO) 14.

The SAW filter 11 performs a process of extracting the satellite signal from the radio wave which is received in the GPS antenna 50. The SAW filter 11 is formed as a band pass filter through which a signal having 1.5 GHz bandwidth is caused to pass.

The RF processing unit 12 is provided with a phase synchronization circuit (phase locked loop: PLL) 121, a low noise amplifier (LNA) 122, a mixer 123, an IF amplifier 124, an intermediate frequency (IF) filter 125, and an A/D converter (ADC) 126.

The phase synchronization circuit 121 generates a clock signal obtained by multiplying the oscillation signal of the TCXO 14 which oscillates at several tens of MHz at a frequency of 1.5 GHz bandwidth. Meanwhile, a time constant of a loop filter (a low pass filter), (not shown) which is provided in the phase synchronization circuit 121 is preferably set to be in a range of, for example, 0.1 m/second to 100 m/second, and is more preferably set to be in a range of 0.5 m/second to 50 m/second.

The satellite signal which is extracted by the SAW filter 11 is amplified by the LNA 122. The satellite signal which is amplified by the LNA 122 is mixed with the clock signal output from the phase synchronization circuit 121 in the mixer 123 and down-converted into a signal (the IF signal) of an intermediate frequency band (for example, several MHz). The signal mixed in the mixer 123 is amplified by the IF amplifier 124.

Through the mixing in the mixer 123, the IF signal and a frequency signal of a GHz order are also generated, and thus the IF amplifier 124 amplifies the IF signal and the frequency signal. The IF filter 125 causes the IF signal to pass therethrough, and removes the frequency signal (specifically, attenuates the frequency signal a predetermined level). The IF signal passing through the IF filter 125 is converted into the digital signal by the A/D converter (ADC) 126.

The base band processing unit 13 is configured to include a digital signal processor (DSP) 131, a central processing unit (CPU) 132, a static random access memory (SRAM) 133 and a real time clock (RTC) 134, and performs various processes by setting the oscillation signal of the TCXO 14 as the clock signal.

The DSP 131 and the CPU 132 cooperatively demodulate a baseband signal from the IF signal, obtain the orbital information and time information which are included in the navigation message, and then perform a process of the normal positioning mode or a process of the position fixing mode.

The SRAM 133 stores, for example, an elevation angle mask which is used in the position fixing mode or the positional information of the reception point which is set in accordance with the time information and the orbital information which are obtained above, and a predetermined control command (a control command for setting a position). The RTC 134 generates timing for performing a baseband process. The RTC 134 is counted up by the clock signal from the TCXO 14.

Specifically, the base band processing unit 13 obtains the orbital information and the time information which are included in the navigation message and performs a process of storing the obtained information in the SRAM 133.

In addition, in the position fixing mode, the base band processing unit 13 outputs the high-accuracy 1PPS by using, the orbital information of one or more of the GPS satellites 2 which is stored in the SRAM 133, and the positional information of the reception point which is stored in the SRAM 133. Specifically, the base band processing unit 13 is provided with a 1PPS counter which counts a timing of generating each pulse of the 1PPS, in a portion of the RTC 134, and calculates a propagation delay time required for the satellite signal transmitted from the GPS satellite 2 to reach the reception point by using the orbital information of the GPS satellite 2 and the positional information of the reception point, and then changes a setting value of the 1PPS counter to an optimal value based on the propagation delay time.

Meanwhile, in the normal positional mode, the base band processing unit 13 may output the 1PPS based on the reception point and the time information which are obtained from the positioning calculation.

In addition, the base band processing unit 13 outputs NMEA data which includes various pieces of information such as the positional information and the time information as a result of the positioning calculation, and a reception state (the number of times of capturing the GPS satellite 2, the strength of the satellite signal, or the like).

An operation of the GPS receiving unit 10 configured as above is controlled by the processing unit (CPU) 20 as illustrated in FIG. 3.

The processing unit 20 controls the operation of the GPS receiving unit 10 by receiving various types of control commands with respect to the GPS receiving unit 10, and performs various processes by receiving the 1PPS or the NMEA data which is output from the GPS receiving unit 10. Note that, the processing unit 20 may perform various processes in accordance with a program which is stored in an arbitrary memory, for example.

The processing unit 20 is provided with the phase comparator 21, the loop filter (the filter) 22 which is a low pass filter, a digital signal processor (DSP) 23, the divider 24, and a GPS control unit 25. As described above, the phase synchronization circuit 16 is formed of the phase comparator 21, the loop filter 22, and the divider 24 of the processing unit 20, and the crystal oscillator 30. Note that, the DSP 23 and the GPS control unit 25 may be one component.

The DSP 23 periodically (for example, for every second) obtains the NMEA data from the GPS receiving unit 10, creates statistical information at a predetermined time by collecting the positional information (the result of the positioning calculation in the normal positioning mode by the GPS receiving unit 10) which is included in the NMEA data, and performs a process of generating the positional information of the reception point based on the statistical information.

The GPS control unit 25 transmits the various control commands to the GPS receiving unit 10, and control the operation of the GPS receiving unit 10. Specifically, the GPS control unit 25 transmits the control command for setting mode to the GPS receiving unit 10. With this, an operation mode of the GPS receiving unit 10 is set.

The divider 24 outputs a divided clock signal of 1 Hz by f-dividing the clock signal (frequency: f) output from the crystal oscillator 30. Note that, it is not possible to use the atomic oscillator 31 of the clock supply apparatus 3 as the crystal oscillator 30. The reason is that the atomic oscillator 31 is disposed on the outside of the time synchronization apparatus 1, that is, at a position separated from the divider 24 and the loop filter 22 of the phase synchronization circuit 16, and is connected to the time synchronization apparatus 1 via the optical fiber 52, and thus when the phase synchronization circuit 16 is formed by using the atomic oscillator 31, unacceptable time delay may occur.

The phase comparator 21 compares a phase of the 1PPS which is output from the GPS receiving unit 10 with a phase of the divided clock signal of 1 Hz which is output from the divider 24. A phase difference signal as a comparison result of the phase comparator 21 is input to the crystal oscillator 30 via the loop filter 22. The parameter of the loop filter 22 is set by the DSP 23.

The divided clock signal of 1 Hz output from the divider 24 synchronizes with the 1PPS output from the GPS receiving unit 10, and the time synchronization apparatus 1 outputs the highly accurate 1PPS having a high-accuracy frequency which is obtained by synchronizing the divided clock signal with the UTC, that is, the second time signal to the outside thereof. In addition, the time synchronization apparatus 1 outputs the latest NMEA data for highly single second by synchronizing with the 1PPS. Further, the time synchronization apparatus 1 also outputs the clock signal having the frequency of f, which is output from the crystal oscillator 30.

In addition, the crystal oscillator 30 is configured so as to finely control the frequency in accordance with an output voltage (a control voltage) of the loop filter 22, and as described above, the clock signal which is output from the crystal oscillator 30 is completely synchronized with the 1PPS which is output from the GPS receiving unit 10 by the phase comparator 21, the loop filter 22, the DSP 23, and the divider 24, and the second time signal which is output from the divider 24 completely synchronizes with the 1PPS which is output from the GPS receiving unit 10. That is, a component formed of the phase comparator 21, the loop filter 22, the DSP 23, and the divider 24 functions as a "synchronization control unit" which causes the clock signal (the second time signal which is output from the divider 24) which is output from the crystal oscillator 30 to synchronize with the 1PPS.

In addition, by setting the time constant of the loop filter 22 as described below, it is possible to remove or reduce a noise component included in the 1PPS (the second time signal) which is generated by the GPS receiving unit 10 by the loop filter 22 (the phase synchronization circuit 16). In other words, it is possible to reduce the phase fluctuation of the second time signal, and to improve the short-term time (phase) accuracy of the second time signal, thereby improving the short-term time (phase) accuracy in the network synchronization.

In addition, the temperature sensor 40 is disposed in the vicinity of the crystal oscillator 30, and the DSP 23 performs a process of temperature-compensating a frequency temperature behavior of the crystal oscillator 30 in accordance with a detection value (a detection temperature) of the temperature sensor 40 by adjusting the output voltage of the phase comparator 21. Note that, a temperature sensor may be omitted and the aforementioned process may also be omitted.

Meanwhile, examples of the oscillator of the phase synchronization circuit 16 of the time synchronization apparatus 1 include an atomic oscillator and the like without limiting the crystal oscillator 30.

The time constant of the loop filter 22 is preferably set as follows.

First, the phase of the 1PPS which is generated by the GPS receiving unit 10 is shifted for a short-term period of time in accordance with a state of the radio wave including the satellite signal which is transmitted from the GPS satellite 2, and received in the GPS receiving unit 10 via the GPS antenna 50, in some cases. This is because that the noise component is included in the 1PPS which is generated by the GPS receiving unit 10 depending on the state of the radio wave. Meanwhile, Examples of factors that greatly affect the state of the radio wave which is received by the GPS receiving unit 10 include the influence of ionosphere, the influence of other radio waves, disposition of the GPS satellite 2, and an obstacle between the GPS satellite 2 and the GPS antenna 50. Here, the time constant (cutoff frequency) of the loop filter 22 does not affect on the second time signal which is output from the phase synchronization circuit 16 by the state of the radio wave, or is set as a value for reducing any of the aforementioned effects, that is a value for removing or reducing the noise component included in the 1PPS which is generated by the GPS receiving unit 10.

Specifically, it is preferable that the time constant of the loop filter 22 is set within a range of 1 second to 10 seconds. In addition, it is more preferable that the time constant of the loop filter 22 is set within a range of 1 second to 5 seconds.

When the time constant is greater than an upper limit value, also depending on other conditions; a required signal component is likely to be removed or reduced.

In addition, when the time constant is lower than a lower limit value, also depending on other conditions; the noise component included in the 1PPS which is generated in the GPS receiving unit 10 is likely to be removed or reduced.

Here, the time synchronization system 100, the comparative system which is obtained by removing the phase synchronization circuit 16 from the time synchronization system 100 are prepared and respectively operated so as to compare the time accuracy. That is, each of the time synchronization system 100 and the comparative system are operated, a shift amount of phases between the generated first time signal and second time signal (time) is calculated, and then a graph is created by representing the shift amount and the time by the vertical axis and the horizontal axis respectively. FIG. 5 illustrates the result for the comparative system, and FIG. 6 illustrates the result for the time synchronization system 100.

In a case where the comparative system which does not include the phase synchronization circuit 16, as illustrated in FIG. 5, the phase fluctuation of the second time signal occurs, a sudden large phase shift occurs during the time that the satellite signal can be received.

In contrast, in a case of the time synchronization system 100, as illustrated in FIG. 6, it can be found that the phase fluctuation of the second time signal is reduced or removed and thus the short-term time accuracy is improved during the time that the satellite signal can be received.

As described above, according to the time synchronization system 100, the GPS receiver 15 is provided with the phase synchronization circuit 16, and thus it is possible to reduce the phase fluctuation of the second time signal and to improve the short-term time accuracy of the second time signal. With this, in the network synchronization, it is possible to improve the short-term time synchronization accuracy.

In addition, in a case where the GPS receiving unit 10 can receive the satellite signal, it is possible to generate and output the second time signal by the time synchronization apparatus 1, and in a case of the occurrence of hold-over, the first time signal can be generated and output by the clock supply apparatus 3 instead of the second time signal. Therefore, even in a case of the occurrence of hold-over, in the network synchronization, it is possible to maintain the short-term time synchronization with high accuracy, and thereby to realize the time synchronization with high accuracy of n second-level.

As described above, the time synchronization system according to the invention has been described with reference to the embodiment illustrated in the drawings; however, the invention is not limited to the embodiment described above and, for example, the configuration of each portion can be replaced with any configuration having an equivalent function. In addition, other optional constituents may be added.

Further, in the embodiment described above, the example of the time synchronization system using the GPS has been described; however, the invention is not limited to the GPS, and a global navigation satellite system (GNSS) other than the GPS, such as Galileo or GLONASS, may be also used.

Note that, in the embodiment described above, the example of the time synchronization system used in the network synchronization has been described; however, in the invention, an application of the time synchronization system is not limited to the network synchronization, for example, the time synchronization system may be used alone.

What is claimed is:

1. A time synchronization system comprising:
   a clock supply apparatus that includes a first oscillator and generates a first time signal; and
   a time synchronization apparatus that includes a receiver, and a fluctuation reducing unit, wherein the receiver generates a second time signal based on a satellite signal, the fluctuation reducing unit includes a second oscillator that generates a clock signal, and the fluctuation reducing unit decreases fluctuation in a phase of the second time signal using the clock signal from the second oscillator and generates a fluctuation-reduced second time signal, further wherein:
   the time synchronization apparatus is provided on an outside of the clock supply apparatus, and
   the clock supply apparatus generates the first time signal using the fluctuation-reduced second time signal.

2. The time synchronization system according to claim 1, wherein the time synchronization system is used in network synchronization based on a master-slave synchronization method.

3. The time synchronization system according to claim 1, wherein the first oscillator is an atomic oscillator.

4. The time synchronization system according to claim 1, wherein the receiver and the clock supply apparatus are disposed at positions which are separated from each other.

5. The time synchronization system according to claim 1, wherein the receiver and the clock supply apparatus are connected to each other via an optical fiber.

6. The time synchronization system according to claim 1, wherein the fluctuation reducing unit includes a phase synchronization circuit.

7. The time synchronization system according to claim 6, wherein the phase synchronization circuit includes a filter, and
   wherein a time constant of the filter is set within a range of 1 second to 10 seconds.

8. The time synchronization system according to claim 1, wherein the first time signal is generated so as to be used when it is not possible to generate the second time signal.

9. The time synchronization system according to claim 1, wherein a distance between the time synchronization apparatus and the clock supply apparatus is greater than or equal to ten meters.

10. The time synchronization system according to claim 1, wherein the first oscillator is an atomic oscillator and the second oscillator is an oven controlled crystal oscillator.

11. A time synchronization system comprising:
    a clock supply apparatus that includes a first oscillator and generates a first time signal; and
    a time synchronization apparatus that includes a receiver and a fluctuation reducing unit, wherein the fluctuation reducing unit generates a second time signal based on a satellite signal received by the receiver, and the fluctuation reducing unit includes a divider, a second oscillator, a comparator, and a loop filter, wherein:
    the divider outputs a divided clock signal based on a signal from the second oscillator,
    the comparator compares the phase of the satellite signal with the phase of the divided clock signal and outputs a phase difference signal to the second oscillator via the loop filter,
    the second oscillator outputs the second time signal based on the phase difference signal, and
    the clock supply apparatus determines the first time signal based on the second time signal.

* * * * *